United States Patent [19]
Kobayashi et al.

[11] Patent Number: 5,645,909
[45] Date of Patent: Jul. 8, 1997

[54] OPTICAL RECORDING MEDIUM AND METHOD FOR FORMING SAME

[75] Inventors: Hideo Kobayashi; Osamu Ueno; Hironori Gotoh, all of Ebina, Japan

[73] Assignee: Fuji Xerox Co., Ltd., Tokyo, Japan

[21] Appl. No.: 544,938

[22] Filed: Oct. 18, 1995

[30] Foreign Application Priority Data

Oct. 19, 1994 [JP] Japan .................................. 6-253971

[51] Int. Cl.[6] ...................................................... B32B 3/00
[52] U.S. Cl. ...................... 428/64.1; 428/64.4; 428/64.5; 428/64.6; 428/913; 430/270.12; 430/270.13; 430/495.1; 430/945; 369/275.1; 369/275.2; 369/275.3; 369/275.4; 369/283
[58] Field of Search ............................ 428/64.1, 642, 428/64.4, 64.5, 64.6, 64.7, 64.8, 913; 430/270.1, 270.11, 270.12, 270.13, 270.14, 495, 945; 369/283, 288, 275.1, 275.2, 275.3, 275.4

[56] References Cited

FOREIGN PATENT DOCUMENTS 5-282705  10/1993  Japan .

OTHER PUBLICATIONS

"Land & Groove Recording on Phase Change Optical Disk (3) Track pitch dependence;" K. Nishiuchi, et al.; pre–text 28p–L–5, 94 Spring Appl. Phys. Association, 1994.

"Land and Groove Recording for High Track Density on Phase–Change Optical Disks;" N. Miyagawa et al.; Jpn. J Appl. Phys. vol. 32 (1993) pp. 5324–5328.

"High Density Phase Change Optical Disks Using Land & Groove Recording Method;" E. Ohno et al., Proc. 93, 5th Phase Change Recording Mtg., (1993) pp. 114–119.

"Recording characteristics of a GeSbTe phase change optical disk using a 488 nm wavelength laser beam;" H. Yamazaki et al., Proc. '93 Symposium on Phase Change Optical Disks, (1993), pp. 75–80.

"High Density Optical Recording by Superresolution," Y. Yamanaka et al., Jpn. J. Appl. Phys. vol. 28, (1989), pp. 197–200.

"High Density optical disk with V–shaped grooves;" M. Nagashima, App.. Phys. Lett. 42(2), (1983), pp. 144–146.

"Suppression of Crosstalk by Control of Groove Depth in Recording on land and Groove" K. Miyagawa et al.; pre–text 18a–T–3, '92 Autumn Appl. Phys. Association (1992).

Primary Examiner—Patrick Ryan
Assistant Examiner—Elizabeth Evans
Attorney, Agent, or Firm—Oliff & Berridge

[57] ABSTRACT

An optical recording medium for a land & groove recording method capable of suppressing crosstalk and cross-erase (increase of jitter) upon increasing the capacity by the increase of track density, wherein a depth for a groove is made greater than 60 nm, at least one of a protection layer, a recording layer and an interference layer is formed to a layer thickness different between the groove and the land, such that reflectance to an optical beam upon irradiation of the optical beam to a predetermined track comprising the land or the groove is equal with each other between a portion in a recorded state and a portion in a unrecorded state of an adjacent track adjacent with the predetermined track, and a land wall for one of the protection layer, the recording layer and the interference layer is made thinner than the thickness of the groove and the land or removed.

8 Claims, 10 Drawing Sheets

OPTICAL RECORDING MEDIUM AND METHOD FOR FORMING SAME

BACKGROUND OF THE INVENTION

1. Field of the Invention

The present invention relates to an optical recording medium capable of recording and reproducing information signals to both of grooves and lands therebetween and more in particular to an optical recording medium capable of increasing capacity by increased track density.

2. Description of the Prior Art

In recent years, various rewritable type optical recording media capable of rewriting information have been studied as the optical recording media for recording, for example, processing data of a computer and audio or video digital signals. Particularly, since the amount of data becomes enormous, for example, in digitalization of video signals, it has been demanded more for increasing the capacity of information recording in optical recording media or apparatus therefor.

In view of the above, for coping with increasing capacity of the image recording, various attempts have been made at present such as shortening of laser wavelength (Yamanaka, et. al; "Recording/Erasing Characteristic of GeSbTe System Phase Change Optical Disc by a Light at 488 nm", in '93 Phase Change Optical Disc Symposium, pp 75), "Super Resolution Optical Recording System" (Yamanaka, etc.; Jpn. J. Appl. Phys. 28, '89, pp 297) or "V-Groove Substrate" (M. Nagashima; Appl. Phys. Lett. 42, '83, pp 144).

However, all the techniques described above, suffer from a large restriction that special functions have to be provided additionally to optical system parts, electric circuits, etc. of optical recording/reproducing apparatus for realizing the method.

Then, a land & groove recording method of using a phase change type optical recording system has been proposed as a technique of increasing the capacity with addition of no particular functions to the apparatus (Miyagawa, et al: "Crosstalk Reducing Effect by Groove Depth Control in Land & Groove Recording", pre-text 18a-T-3 for '92 Autumn Applied Physics Association). This recording system has attracted attention as a technical means capable of doubling track density by conducting recording to both of lands and grooves of an optical recording medium instead of conducting only to one of them as in the prior art optical recording method, thereby easily increasing the capacity of information recording.

However, the land & groove recording method involves a problem regarding crosstalk and cross-erase as described below in case of further increasing the track density by reducing the track pitch thereby increasing the capacity.

At first, the crosstalk is a phenomenon, occurring upon reproduction of signals recorded in a predetermined track on a land (or groove) that signal components recorded in tracks on adjacent grooves (or lands) are read out. It has been known at present that the crosstalk can be suppressed by properly selecting the depth of the groove in the optical recording medium and that the optimal depth of the groove is reduced as the track width is narrowed as the density of the track is increased.

Meanwhile, cross-erase is a phenomenon, occurring upon recording or erasure relative to a predetermined track on a land (or a groove), that signals (marks) recorded in the tracks in adjacent grooves (lands) are partially erased. Particularly, jitter in the adjacent tracks is increased by the effect of the cross erasure and, in the worst case, this results in a disadvantage of causing reading errors for recorded signals. Increase of the jitter or causing of signal reading error may also be caused to some extent by the effect of the crosstalk. It has been known that the cross-erasure increases as the depth of the groove is reduced.

Therefore, in the land & groove recording method, if the track density is intended to be increased further, the depth of the groove has be to be reduced for suppressing the crosstalk, whereas reducing of the depth causes a conflicting problem of increasing the jitter in adjacent tracks by the effect of the cross-erase thereby deteriorating the recording characteristics. Accordingly, it has been difficult in this recording method to increase the capacity of information recording by the increased track density. By the way, it has been reported that the limit for increasing the track density in the land & groove method is 0.7 μm as a track pitch (Nishiuchi, et al; "Land & Groove Recording (3) Track Pitch Dependency of Phase Change Optical Disc" in pre-text 28p-L-5 for '94 Spring Applied Physics Association).

SUMMARY OF THE INVENTION

An object of the present invention is to provide an optical recording medium capable of suppressing the crosstalk while suppressing cross-erase (increase of jitter) as well upon increasing the capacity by increased track density as a land & groove recording method an optical recording medium.

The foregoing object can be attained by an optical recording medium in accordance with the present invention having a medium structure in which a protection layer, a recording layer, an interference layer and a reflection layer are laminated, recording tracks comprising grooves and lands are formed, and information signals are recorded and reproduced by utilizing the change of reflectance obtained by irradiating an optical beam to both of the grooves and the lands, wherein at least one of the protection layer, the recording layer and the interference layer is formed to a layer thickness different between the groove and the land, whereby a reflectance to the optical beam upon irradiation of the optical beam to a predetermined track is equal with each other between a portion in a recorded state and a portion in an unrecorded state of a track adjacent to the predetermined track.

The thickness for each of the layers formed at different thickness in the groove and the land is properly determined within such a range as satisfying the foregoing condition and it is preferred that the ratio for each of the layer thickness between the groove and the land is about from 1:1.5 to 1:5. The portion in the unrecorded state means a not-yet recorded portion or an erased portion. Further, for making the reflectance to the optical beam equal with each other between the portion in the recorded state and the portion in the unrecorded state in the tracks adjacent with the predetermined track comprising the groove and the land upon irradiation of the optical beam to the predetermined track, it is possible for a method of properly adjusting the ratio between the groove width and the land width. In this case, the ratio between the groove and the land is desirably about from 1:2 to 2:1.

Further, the depth of the groove in the reflection layer is made more than 60 nm to prevent crosstalk, as well as prevent increase of jitter by cross-erase.

Upon forming the layers of different thickness as described above, an oblique deposition method is applicable and, in addition, a method of a making layer thickness different between the groove and the land such as an oblique etching method, a spin coating method, an RF bias sputtering method or a CVD method is also applicable. For instance, the oblique deposition method deposits materials to be applied (deposited) by projecting them in an oblique direction relative to a substrate thereby depositing films to an uneven surface with different thickness respectively, in which RF sputtering, ion beam sputtering, vapor deposition, CVD or like other thin film forming means is applicable. Further, the oblique etching method etches the layer after deposition in an oblique direction relative to the substrate, thereby making the thickness different on an uneven surface, in which an ion milling method, a reversed sputtering method or like other thin film etching means is applicable. In the case of forming layers of different thickness, each of the means described above can be used in an appropriate combination.

The optical recording medium in accordance with the present invention has a feature in the optical recording medium based on the premise of the technical means described above, wherein the thickness of the land wall for any one of the protection layer, the recording layer, the interference layer and the reflection layer is made smaller than the layer thickness of the groove and the land or the wall is eliminated.

In this technical means, the land wall means a side wall forming a step between the land and the groove. The film for which the land wall is reduced for the thickness or eliminated is any one or plurality of the protection layer, the recording layer, the interference layer and the reflection layer, the reflection layer being most effective.

Upon forming the land wall as described above, the oblique etching method is applicable, as well as a dry etching method, a reversed sputtering method, wet etching method or the like may also be applied. Among them, the oblique etching method is an effective means since etching rate is high at the inclined portion, and etching gives less effect to the layer on the land and the groove. The oblique etching method is basically the same as the oblique etching method described previously, only with a slight difference in that the layer deposited on the step forming the land wall is mainly etched.

For the optical recording system of the optical recording medium in accordance with the present invention, any of systems conducting recording and reproduction by utilizing the change of reflectance upon irradiation of the optical beam may be used and, for instance, phase change type, phase separation type or like other optical recording method is applicable. The recording layer is formed with a phase change type recording material such as a Ge-Sb-Te system or Ag-In-Sb-Te system, or phase separation type recording material such as Sb-Ox. Further, the protection layer and the interference layer are formed with materials comprising, as the main ingredient, dielectric materials such as $SiO_2$, $ZnS$—$SiO_2$, as well as SiN, SiC, $TiO_2$, ZnS, $Al_2O_3$, AlN, $Ta_2O_5$, DLC (Diamond Like Carbon). Further, the substrate and the reflection layer are formed by properly selecting from known materials.

The present invention may also be properly combined with other techniques for increasing the recording density such as a phase difference recording system, a PRML system, a short wavelength laser beam recording system or the like. Particularly, in a case of a combination of the optical recording medium according to the present invention and the short wavelength laser beam recording system, since the spot diameter of the optical beam is further reduced, the track density can be increased further (narrowing for the track pitch).

In accordance with the present invention, since the reflectance from the portion in the recorded state and the portion in the unrecorded state of the track adjacent with the track under irradiation of the laser is made equal with each other by making the layer thickness different between the groove and the land in the predetermined layer, crosstalk can be suppressed. In addition, in a case of reducing the track pitch to increase the track density, if the depth of the groove in the recording layer is made greater than 60 nm for suppressing the cross-erase, crosstalk can be suppressed by making the layer thickness different between both of the layers for the groove and the land. Therefore, it is possible to provide an optical recording medium having high density and high reliability for the land & groove method.

Further, in a case of preventing the crosstalk by reducing the depth of the groove, since heat conduction to the adjacent track is remarkably reduced or shut-out by reducing or removing the film deposited to the land wall by etching, the cross-erase can be prevented.

As a result, it is possible to increase the capacity for information recording by increasing the track density. In view of the above, it is possible to increase the track density in the present invention within a range from 0.3 to 0.65 µm, preferably, within a range from 0.4 to 0.5 µm.

BRIEF DESCRIPTION OF THE DRAWINGS

FIG. 2 shows an example of an oblique deposition method in which (a) is a conceptional plan view for an example of a device used for the method and (b) is a cross sectional view taken along line B—B;

FIG. 7 shows an example of an oblique etching method in which (a) is a conceptional plan view for an example of a device used for the method and (b) is a cross sectional view taken along line B—B;

DESCRIPTION OF THE PREFERRED EMBODIMENTS

The present invention will be explained more specifically by way of preferred embodiments with reference to the drawings. The present invention is no way limited to such embodiments but can be properly modified for design within a scope not departing from the gist of the invention.

EXAMPLE 1

Figure 1:
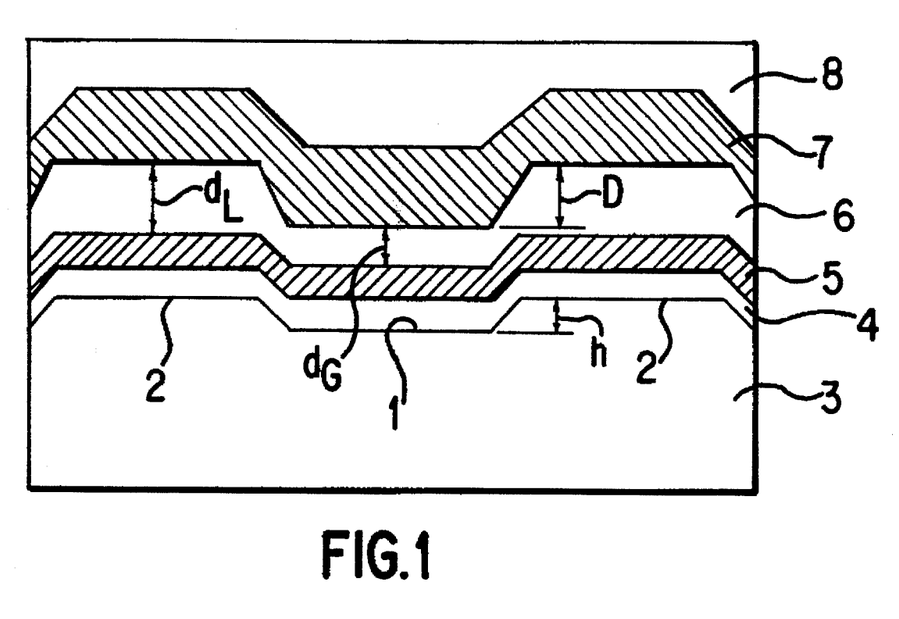
FIG. 1 is a schematic cross sectional view illustrating an optical recording medium according to a preferred embodiment (Example 1) of the present invention.

An optical recording medium in this embodiment comprises, as shown in FIG. 1, a substrate 3 made of polycarbonate in which a groove 1 and a land 2 are formed such that the depth h for the groove 1 is 35 nm, a pitch for the land 2 is 1.0 µm and a ratio between the width for the groove 1 and the width for the land 2 is 1:1 and a track pitch is 0.5 µm, a protection layer 4 of 80 nm thickness made of $SiO_2$ formed on the substrate 3 by usual RF sputtering, a recording layer 5 of 20 nm thickness made of $Ge_2Sb_2Te_5$ formed on the substrate 3 by usual RF sputtering, an interference layer 6 made of $SiO_2$ formed by oblique sputtering having a layer thickness $d_G$ of 25 nm for the groove 1 and the layer thickness $d_L$ of 50 nm for the land, a reflection layer 7 of 60 nm thickness made of Al-Ti formed by usual RF sputtering and a surface protection layer 8 comprising UV-ray curable resin. The depth D for the recess (groove) of the reflection layer 7 in the optical recording medium is 60 nm.

Figure 2A:
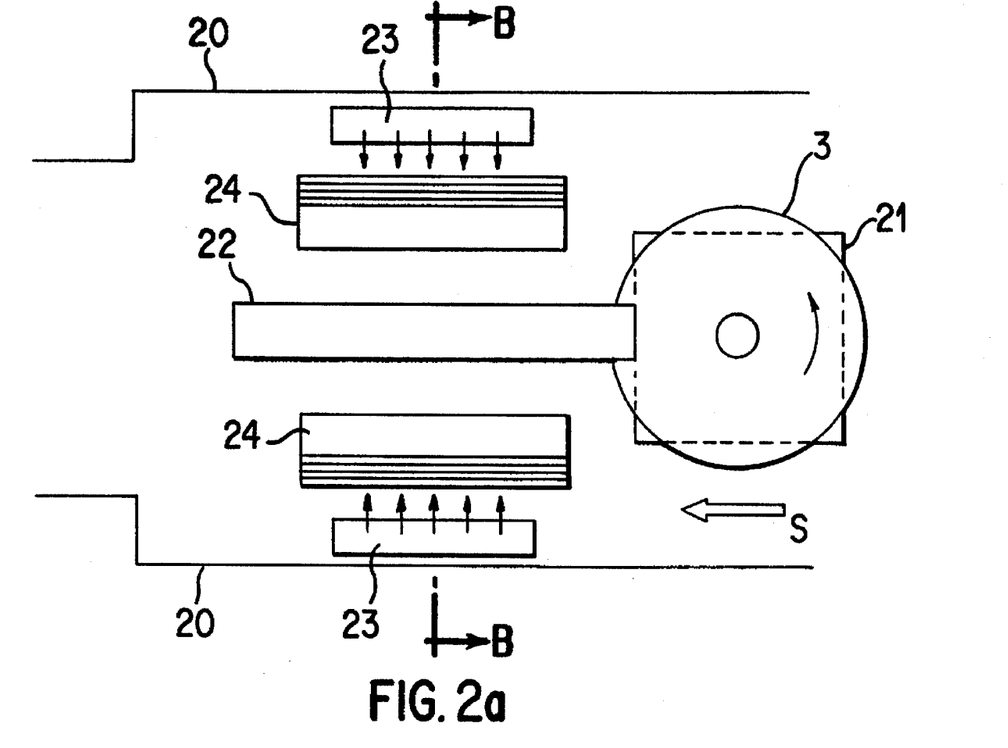
Figure 2B:
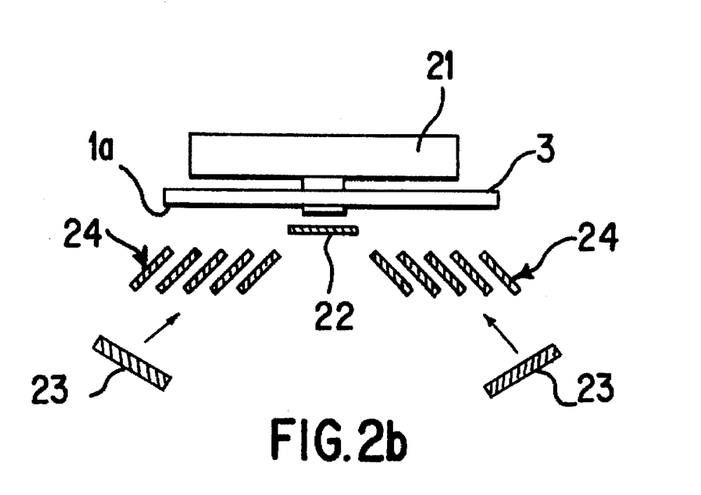

The interference layer 6 was formed by an oblique deposition method using an oblique sputtering method as described below. FIG. 2 schematically shows the constitution of an oblique sputtering device. In the drawing, are shown a chamber 20 a substrate transportation holder 21 for transporting the substrate 3 while holding it rotatably in the chamber 20 along a direction of an arrow S, a mask 22 disposed along a transportation path in the chamber 20, targets 23, and a slit 24 in which a plurality of slit plates are inclined each at a predetermined angle and arranged each at a predetermined interval. Further, the sputtering device is an in-line type. On the substrate 3 transported by the substrate transportation holder 21, are laminated a recording layer and a protection layer as lower layers to the interference layer in a separate chamber room connected continuously before the sputtering device.

At first, the substrate 3 to which the recording layer, etc. were already laminated is transported under auto-rotation in the central portion of the chamber 20 along the direction of the arrow S by the substrate transportation holder 21, and oblique sputtering is conducted to the laminate face 3a of the substrate on which the recording layer etc. are laminated by the targets 23 disposed on both sides of the transportation path. The oblique sputtering is applied by way of the slit 24 in order to suppress, for example, scattering of sputtering particles. The incident angle (projection angle) θ of $SiO_2$ as sputtering particles to the substrate 3 was set to about 10°. It is preferred that each of the projection angles of the sputtering particles from each of the targets is equal with each other. If the angle is different remarkably, the layer thickness is out of right-to-left symmetry relative to the rotational direction to possibly cause troubles upon tracking control or track counting.

In this instance, the thickness of the layer to be deposited is adjusted by properly setting the transportation speed for the substrate, the sputtering power or the like. Further, the ratio of the layer thickness between the groove and the land in the substrate 3 was adjusted by the mask 22. That is, the deposition speed to the groove of the substrate 3 was suppressed by the mask 22. The mask 22 may be saved depending on the content of the design such as deposition conditions.

Figure 3:
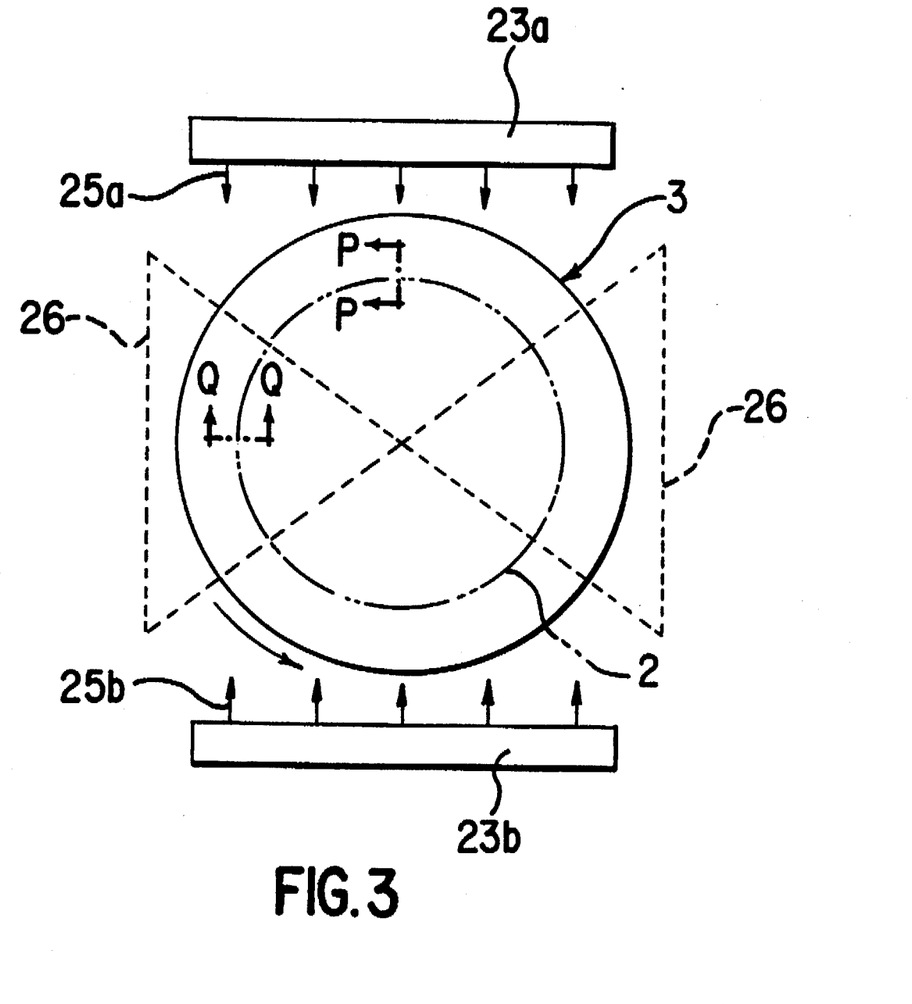
FIG. 3 is an enlarged view for a main portion of FIG. 2(a)
Figure 4A:
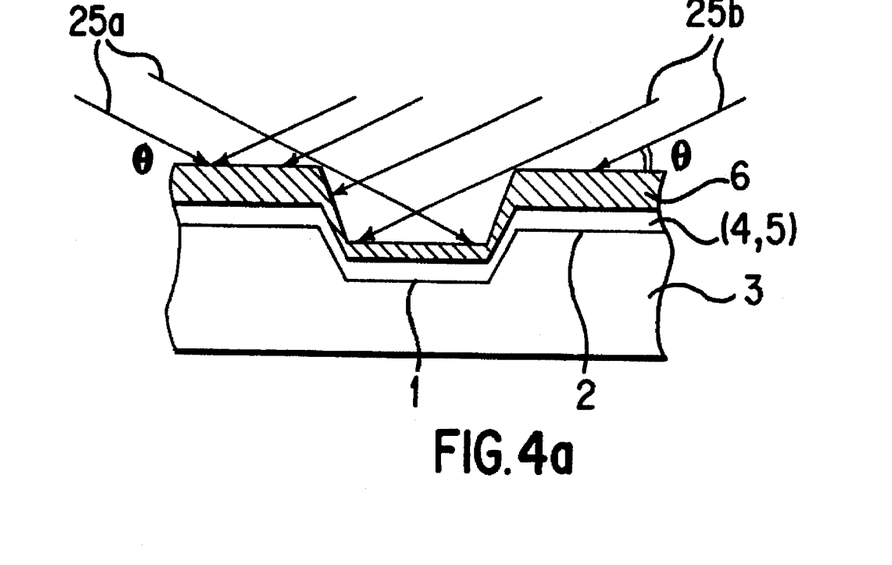
FIG. 4 is an explanatory conceptional view for explaining two deposition states in the oblique deposition method.
Figure 4B:
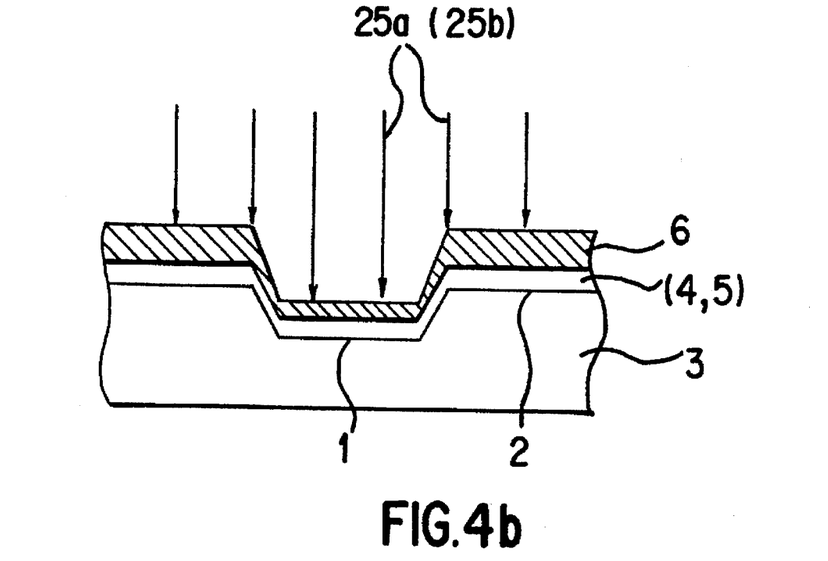

By transportation in the chamber 20 in which the oblique sputtering is conducted, deposition is conducted to the substrate 3 into the following generally classified two states. That is, as shown in FIG. 3, in a case where the rotating substrate 3 is in a region near the targets 23, (in the vicinity of line P—P), sputtering particles 25a, 25b from each of the targets 23a, 23b do not reach (or are restricted from reaching) the groove 1 by being shielded or reduced by the land 2, so that they are mainly deposited on the land 2 as shown in FIG. 4a. On the other hand, in a case when the rotating substrate 3 is in a region apart from the targets 23 (in the vicinity of line Q—Q) as shown in FIG. 3, the sputtering particles 25a, 25b are deposited by substantially identical amount on both of the groove 1 and the land 2 as shown in FIG. 4b. As a result, the sputtering particles are deposited more on the land 2 as compared with on the groove 1. As described above, the interference layer 6 having different layer thickness between the groove and the land is formed.

Figure 5:
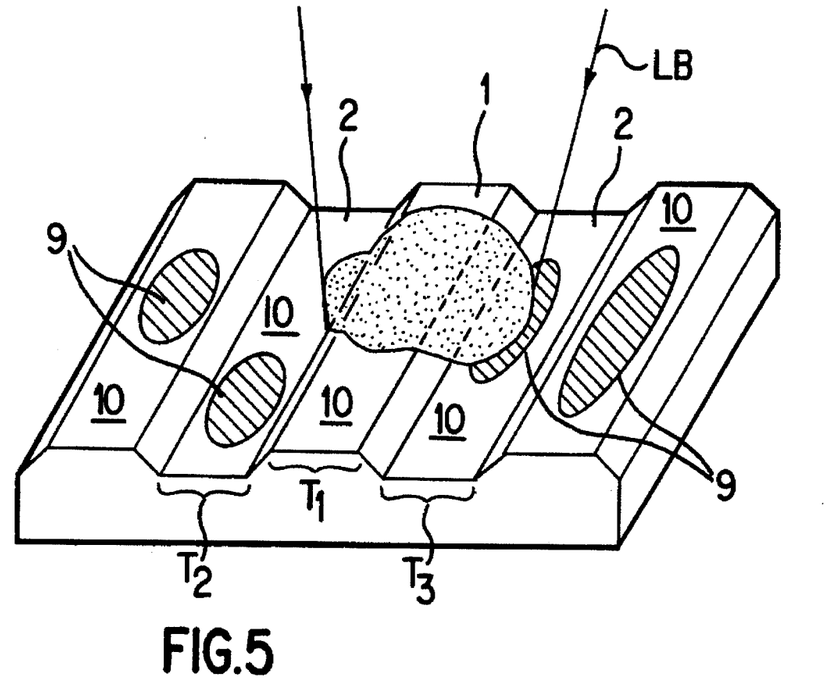
FIG. 5 is a conceptional perspective view for explaining reflection characteristics relative to an optical beam in each of tracks.
Figure 6:
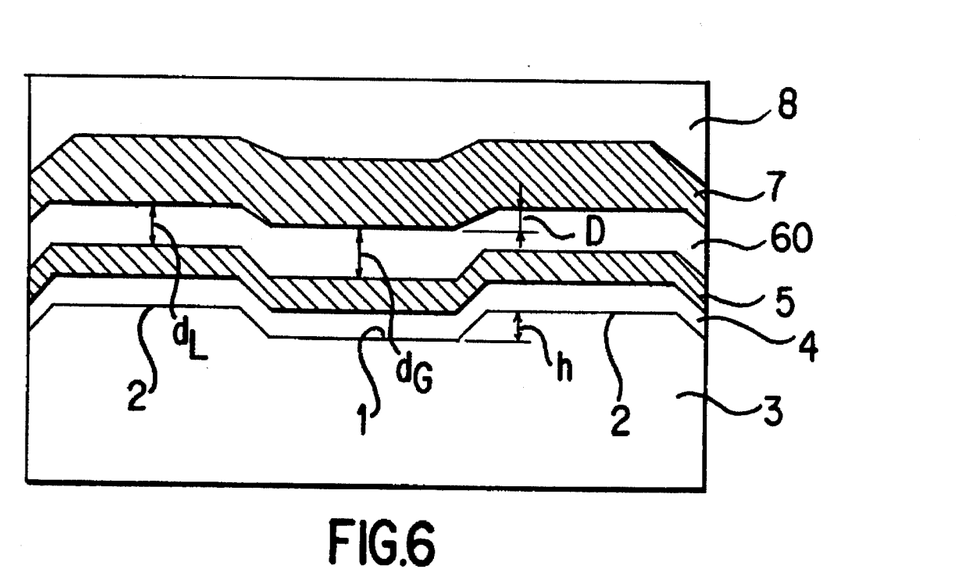
FIG. 6 is a schematic cross sectional view illustrating an optical recording medium in another embodiment according to the present invention.

Since the interference layer is formed with such layer thickness, when an optical beam LB is irradiated in a predetermined track $T_1$ in an unrecorded state, the reflection characteristic to the optical beam LB of the track $T_1$ and adjacent tracks $T_2$, $T_3$ adjacent therewith are in such a relationship that reflectance $R_9$ at a portion 9 of the adjacent track formed with a mark and in the recorded state is equal with reflectance $R_{10}$ at a portion 10 in an unrecorded state, as shown in FIG. 5.

Figure 11:
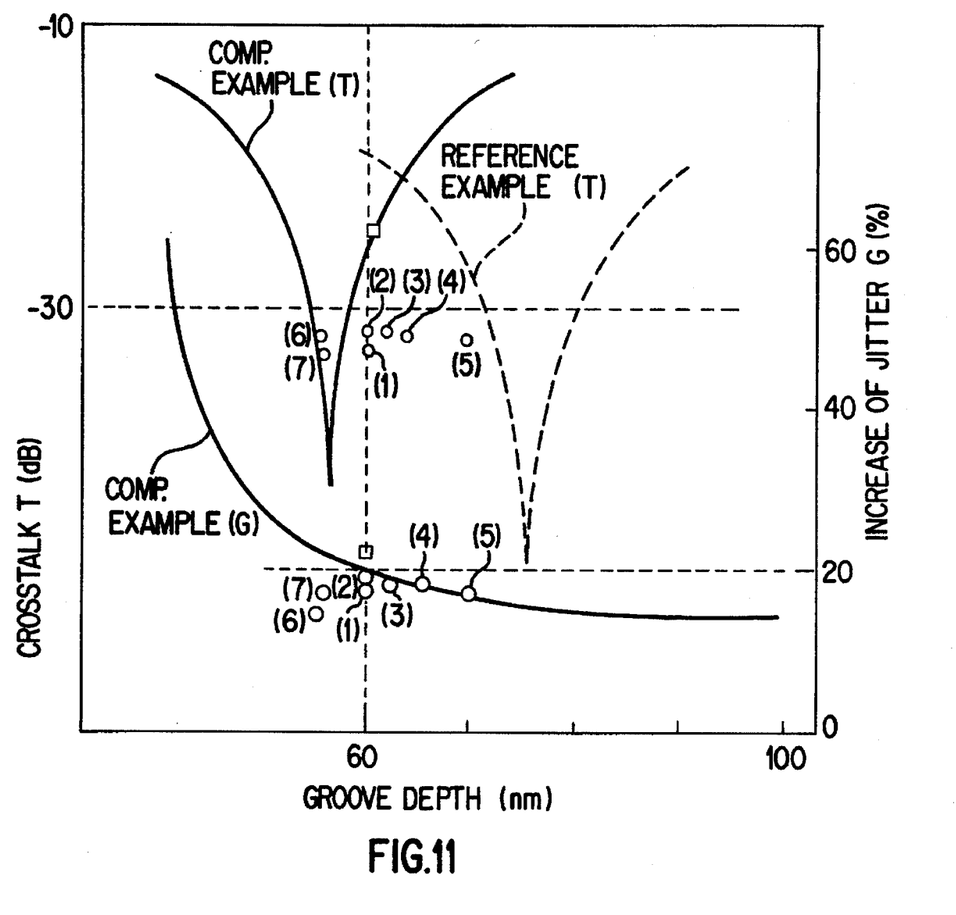
FIG. 11 is a view showing the result of measurement for crosstalk and increase of jitter (cross-erase) in Examples 1–7 and comparative example.

Then, using the optical recording medium of this embodiment, random data signal comprising (1.7) RLL signal bit length 0.4 µm, shortest mark length 0.6 µm) were mark length-recorded to the groove and the land. Then, the crosstalk was measured for the optical recording medium after recording, and change of jitter after 10,000 times of rewriting to the adjacent track under the foregoing recording condition was measured to examine the effect of the cross-erase. FIG. 11 shows the result of measurement for the crosstalk and jitter. The abscissa in FIG. 11 represents the depth of the groove recess in the reflection layer.

From the result of the measurement shown in FIG. 11, it was confirmed, in the optical recording medium according to this embodiment, that the crosstalk was sufficiently suppressed as being less than an allowable level at −30 dB, as well as the cross-erase was also suppressed satisfactorily since the increasing amount of the jitter was less than an allowable level 20% and satisfactory recording characteristics and reproduction characteristics were obtained even in a case of narrowing the track pitch to 0.5 µm.

In a case of forming layers of different thickness by the oblique sputtering method as described above in this embodiment, a mask member 26 (a mask of a shape surrounded by a dotted line) may be optionally disposed between the substrate 3 in a region apart from the target 23 (in the vicinity of line Q—Q) and the target 23 as shown in FIG. 3, whereby the film deposition to the rotating substrate 8 apart from the target 23, particularly, film deposition on the groove 1 can be inhibited (suppressed) and the degree of deposition can be adjusted.

Further, another pair of targets may be disposed optionally in addition to the pair of targets 23a, 23b and sputtering particles may be projected from four directions. Also in this case, a mask member may be properly disposed optionally between each of the targets thereby enabling to adjust the degree of deposition.

Further, the projection angle θ in the oblique sputtering is generally set preferably to such an angle that the non-projected area at the bottom of the groove caused by the shut off for flying of the projected deposition material the land is more than one-half of the entire bottom. If the angle is made greater than the preferred angle described above, since it is difficult to make a difference for the degree of deposition between the groove and the land, it is difficult to attain the aimed difference in the layer thickness. On the contrary, if the angle θ is made smaller, productivity is deteriorated since the film forming speed is retarded.

EXAMPLE 2

The optical recording medium in this embodiment has the same constitution as that in Example 1 except for using a substrate having depth h of 85 nm for the groove 1 of the substrate 3 in Example 1, and forming an interference layer 60 having a layer thickness $d_G$ of 50 nm for the groove 1 and the layer thickness $d_L$ of 25 nm for the land 2 different only for the condition of layer thickness instead of the interference layer 6 in Example 1. Then, the depth D of the groove recess of the reflection layer in the optical recording medium is 60 nm.

Figure 7A:
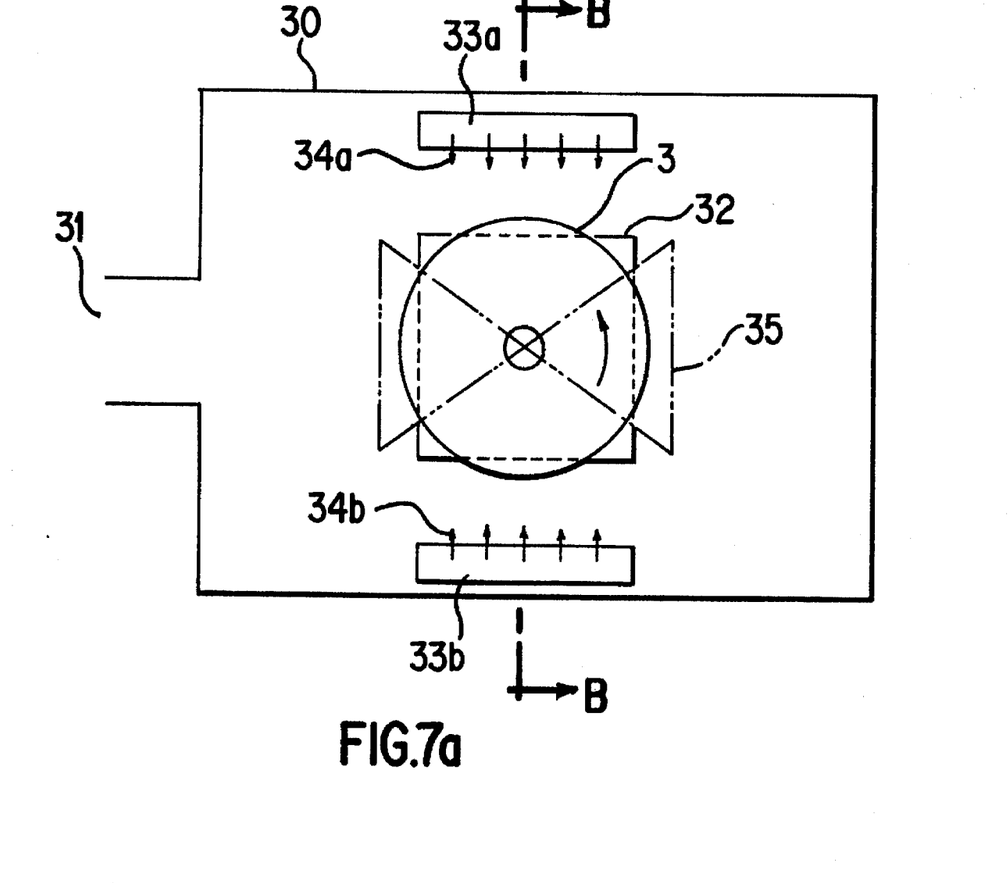
Figure 7B:
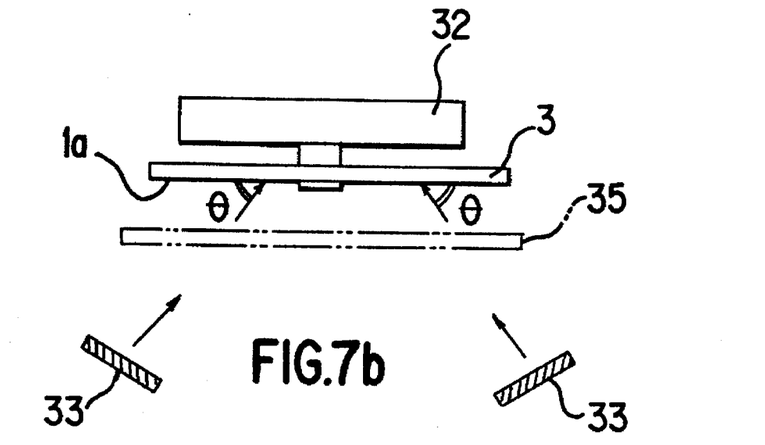

The interference layer 60 was formed by depositing an interference layer forming material ($SiO_2$) to a predetermined thickness by usual RF sputtering and then conducting oblique etching as described below. FIG. 7 schematically shows a constitution of an oblique etching device. In the figure, are shown a chamber 30, an exhaust port 31, a substrate holder 32 for rotatably holding the substrate 3, and an etching beam generation source 33. The oblique etching is of an in-line type. On the substrate 3 held to the substrate holder 32, a recording layer and a protection layer as lower layers to the interference layer are deposited in a separate chamber room connected continuously before the etching device. If necessary, a mask member 35 (a mask of a shape surrounded by a chained line) may be disposed between the substrate 3 and the etching beam generation source 33 as illustrated in FIG. 7, whereby the etching degree can be adjusted properly.

At first, the substrate 3 on which the interference layer, etc. were already laminated is auto-rotated by the substrate holder 32, and etching is applied from an oblique direction by the etching beam generation sources 33 disposed on both sides in the chamber 30 to the laminated surface 3a on which the interference layer, etc. were laminated. The incident angle (irradiation angle) of θ of the etching beam 34 to the substrate 3 was set to about 15°. It is preferred that the irradiation angles of the etching beams from each of the beam generation sources are equal with each other. If the angle is different greatly, the layer thickness after the etching is made is not left-to-right symmetrical relative to the rotational direction to possibly cause troubles upon tracking control or track counting.

Figure 8A:
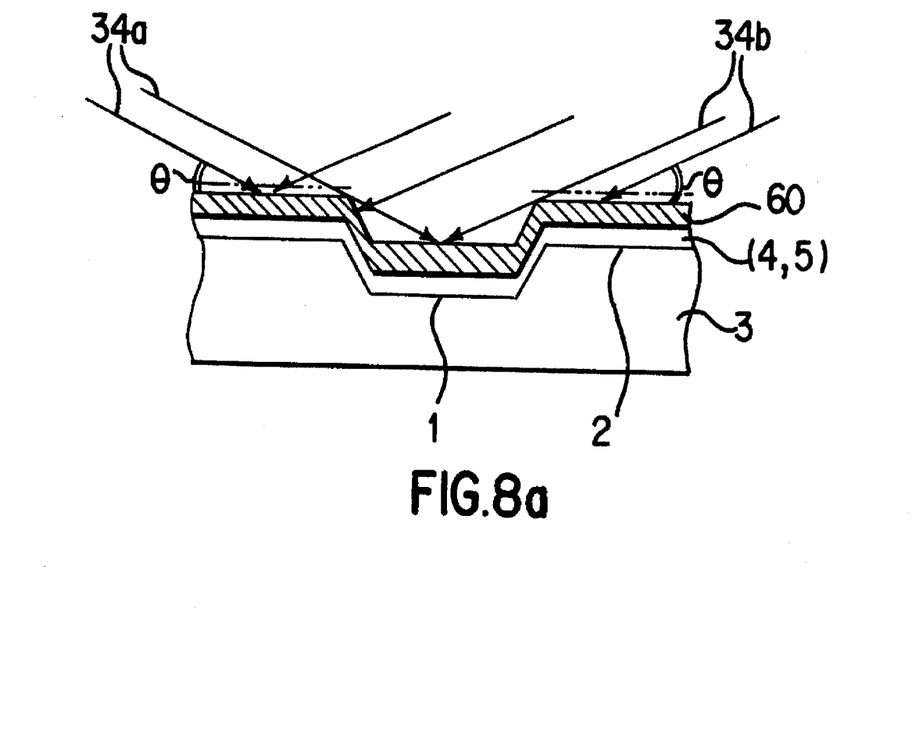
FIG. 8 is an explanatory conceptional view for explaining two etching states in the etching method.
Figure 8B:
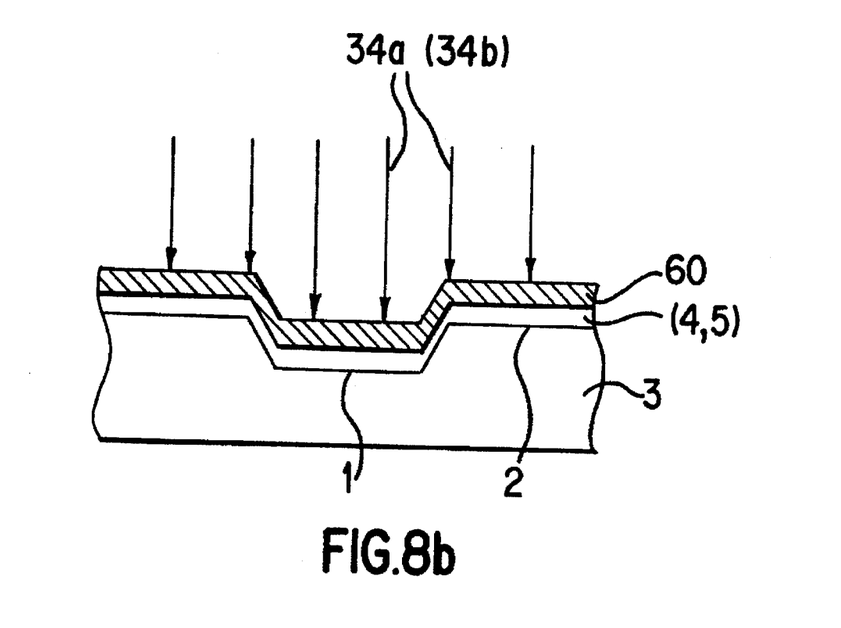

In the chamber 30 of the oblique etching device, etching to the substrate 3 is conducted in the following generally classified two states. That is, in a case where the rotating substrate 3 is in a region near the etching beam generation sources 33, etching beams 34a, 34b from each of the beam generation sources 33a, 33b are shielded (or reduced) by the land 2 and do not reaching (or are restricted from reaching) the groove 1, so that they are irradiated mainly on the land 2 as shown in FIG. 8a. On the other hand, in a case where the rotating substrate 3 is in a region apart from the beam generation sources 33, the etching beams 34a, 34b are irradiated substantially in an identical amount to both of the groove 1 and the land 2 as shown in FIG. 8b. As a result, the etching beam is irradiated more on the land 2 as compared with the groove 1, and the layer thickness at the more irradiated portion is removed more by etching. As described above, an interference layer 6 having different layer thickness for the groove and the land is formed.

Since the interference layer 6 is formed with such a layer thickness, when an optical beam LB is irradiated to a predetermined track $T_1$ in a unrecorded state, the reflection characteristic to the optical beam LB in the track $T_1$ and adjacent tracks $T_2$, $T_3$ adjacent therewith is in such a relationship that the reflectance $R_9$ at a portion 9 of the adjacent tracks formed with a mark and in the recorded state and the reflectance $R_{10}$ at a portion 10 in the unrecorded state are equal with each other, like that in Example 1 (refer to FIG. 5).

Then, by using the optical recording medium of this example and conducting the mark length recording for the groove and the land like that in Example 1, the crosstalk was measured and the change of jitter was also measured for the optical recording medium after recording like that in Example 1. FIG. 11 shows the result of the measurement for the crosstalk and the jitter.

From the result shown in FIG. 11, it was confirmed in the optical recording medium of this example that the crosstalk was sufficiently suppressed as being less than the allowable level at −30 dB, as well as the cross-erase was sufficiently suppressed since the increasing amount of the jitter is less than the allowable level of 20% and that satisfactory recording characteristic and reproducing characteristic were obtained even in a case of narrowing the track pitch to 0.5 μm.

EXAMPLE 3

The optical recording medium in this example has the same constitution as in Example 1 except for using a substrate having the depth h set to 72 nm for the groove 1 of the substrate in Example 1 forming a recording medium having a groove depth $d_G$ of 40 nm for the groove 1 made of Ge-Sb-Te$_2$, and a layer thickness $d_L$ of 20 nm for the land 2 (recording layer) instead of the recording layer in Example 1 and, further, forming the interference layer 6 at an identical thickness for the groove 1 and the land 2. Then, the depth D in the groove recess of the reflection layer in this optical recording medium is 62 nm.

The recording layer was formed by depositing the recording layer forming material to a predetermined thickness by usual RF sputtering and then conducting oblique etching in the same manner as in Example 2.

Since the recording layer is formed with such a layer thickness, when an optical beam LB is irradiated to a predetermined track $T_1$ in an unrecorded state, like that in Example 1, the reflection characteristic to the optical beam LB in the track T1 and the adjacent tracks $T_2$, $T_3$ adjacent therewith is in such a relationship that the reflectance $R_9$ at a portion 9 of the adjacent tracks formed with the tracks and in the recorded state and the reflectance $R_{10}$ at a portion 10 in the unrecorded state are equal with each other (refer to FIG. 5).

Then, using the optical recording medium in this example and after conducting mark length recording to the groove and the land in the same manner as in Example 1, the crosstalk was measured, and the change of the jitter was measured for the optical recording medium after recording in the same manner as in Example 1. FIG. 11 shows the result of the measurement for the crosstalk and the jitter.

From the results shown in FIG. 11, it was confirmed in the optical recording medium of this example that the crosstalk was sufficiently suppressed as being less than the allowable level at −30 dB, as well as the cross-erase was also suppressed satisfactory since the increasing amount of the jitter was less than the allowable level of 20%, and that satisfactory recording characteristic and reproduction characteristic are obtained even in a case of narrowing the track pitch to 0.5 μm.

EXAMPLE 4

The optical recording medium in this example has the same constitution as that in Example 1 excepting for using a substrate having the depth h set to 104 nm for the groove 1 of the substrate 3 in Example 1 and forming an interference layer 60 having a film thickness $d_G$ of 120 nm for the groove 1 made of polyvinyl alcohol and a film thickness $d_L$ of 80 nm for the land 2 instead of the interference layer in Example 1. Then, the depth D of the groove recess for the reflection layer in this optical recording medium is 64 nm. Further, the interference layer was formed by an oblique deposition method by using spin coating.

Since the interference layer is formed with such a layer thickness, when an optical beam LB is irradiated on a predetermined track $T_1$ in a unrecorded state like that in Example 1, reflection characteristic to the optical beam LB of the track $T_1$ and the adjacent tracks $T_2$, $T_3$ adjacent therewith is in such a relationship that the reflectance $R_9$ for a portion 9 of the adjacent track formed with a mark and in the recorded state and the reflectance $R_{10}$ for a portion 10 in the unrecorded state are equal with each other.

Then, using the optical recording medium of this example and after conducting mark-length recording for the groove and the land in the same manner as in Example 1, the crosstalk was measured, and the change of the jitter was measured for the optical recording medium after recording in the same manner as in Example 1. FIG. 11 shows the result of measurement for the crosstalk and the jitter.

From the result of the measurement shown in FIG. 11, it was confirmed in the optical recording medium in this example that the crosstalk was sufficiently suppressed as being less than the allowable level at −30 dB, and the cross-erase was also suppressed satisfactorily since the increasing amount of the jitter is less than the allowable level of 20% and that satisfactory recording characteristic and reproduction characteristic are obtained even in a case of narrowing the track pitch to 0.5 µm.

EXAMPLE 5

The optical recording medium in this example has the same constitution as that in Example 1 excepting for using a substrate having the depth h wet to 70 nm for the groove 1 of the substrate 3 in Example 1, forming a recording layer having a layer thickness $d_G$ of 20 nm for the groove 1 made of Ge-Sb-Te$_2$ and a layer thickness $d_L$ of 40 nm for the land 2 instead of the recording layer 5 in Example 1 and, further, forming an interference layer having the layer thickness $d_G$ of 50 nm for the groove 1 and the layer thickness $d_L$ of 30 nm for the land 2 instead of the interference layer 6 in Example 1. The depth D of the groove recess in the reflection layer of the optical recording medium is 70 nm.

The recording layer was formed by oblique sputtering in the same manner as in Example 1 and the interference layer was formed by depositing the interference layer forming material to a predetermined thickness by usual RF sputtering and then conducting oblique etching in the same manner as Example 2.

Since the recording layer is formed with such a layer thickness, when an optical beam LB is irradiated on a predetermined track $T_1$ in an unrecorded state, like that in Example 1, reflection characteristic to the optical beam LB in the track $T_1$ and the adjacent tracks $T_2$, $T_3$ adjacent therewith is in such a relationship that the reflectance $R_9$ for a portion 9 of the adjacent track formed with a mark and in the recorded state and the reflectance $R_{10}$ for a portion 10 in the unrecorded state are equal with each other (refer to FIG. 5).

Then, using the optical recording medium of this example and after conducting mark-length recording in the same manner as in Example 1 for the groove and the land, the crosstalk was measured, and the change of the jitter was measured for the optical recording medium after recording in the same manner as in Example 1. FIG. 11 shows the result of measurement for the crosstalk and the jitter.

From the result of the measurement shown in FIG. 11, it was confirmed in the optical recording medium in this example that the crosstalk was sufficiently suppressed as being less than the allowable level at −30 dB, and the cross-erase was also suppressed satisfactorily since the increasing amount of the jitter is less than the allowable level of 20% and that satisfactory recording characteristic and reproduction characteristic are obtained even in a case of narrowing the track pitch to 0.5 µm.

COMPARATIVE EXAMPLE

The optical recording medium in this comparative example has the same constitution as that in Example 1 excepting for using a substrate having the depth h of 60 nm for the groove 1 of the substrate 3 in Example 1, forming a recording layer made of Ga-Sb-Te$_2$ having a layer thickness of 25 nm instead of the recording layer 5 in Example 1 and, further, forming an interference layer having a layer thickness of 20 nm instead of the interference layer 6 in Example 1. The layer thickness in the recording layer and the interference layer is equal between the groove and the land. Further, the depth D for the groove recess of the reflection layer in the optical recording medium is 60 nm.

Since each of the layers laminated on the substrate (except for surface protection layer) is formed such that the layer thickness is equal between the groove and the land, when an optical beam LB is irradiated in a predetermined track $T_1$ in the unrecorded state, the reflection characteristic to the optical beam LB of the track $T_1$ and the adjacent tracks $T_2$, $T_3$ in adjacent therewith is in such a relationship that the reflectance $R_9$ for a portion 9 of the adjacent track formed with the mark and in the recorded state, and the reflectance $R_{10}$ for a portion 10 in the unrecorded state are different with each other (refer to FIG. 5).

Then, using the optical recording medium of this comparative example and after conducting mark-length recording for the groove and the land in the same manner as in Example 1, the crosstalk was measured and the change of the jitter was measured for the optical recording medium after recording in the same manner as in Example 1. FIG. 11 shows the result of the measurement for the crosstalk (□) and jitter (■). Further, the crosstalk and the change of the jitter, when the depth of the groove in the optical recording medium was changed, were measured and the result is shown by the solid line in FIG. 11. For the reference, a characteristic curve for the crosstalk in the optical recording medium when the track pitch was set to 0.8 µm in this comparative example was shown by the dotted line in the figure.

From the result of the measurement shown in FIG. 11, it was confirmed in the optical recording medium in this comparative example that not only the cross-erase can not be suppressed sufficiently since the increasing amount of the jitter somewhat exceeds the allowable level of 20% but also the crosstalk could not be suppressed to less than the allowable level at −30 dB. If it is intended to suppress the crosstalk to less than −30 dB in this comparative example, the depth for the groove recess in the reflection layer has to be reduced to less than 60 nm as can be seen from the solid line for comparative example (T). By the way, if the track pitch is increased as great as 0.8 μm as shown in the reference example, the crosstalk (also, the cross-erase) can be suppressed in a case where the depth for the groove recess of the reflection layer is set to about 70–80 nm, it can be seen that increased track density (restriction of the track pitch to less than 0.65 μm) can not be attained in this approach.

EXAMPLE 6

Figure 9:
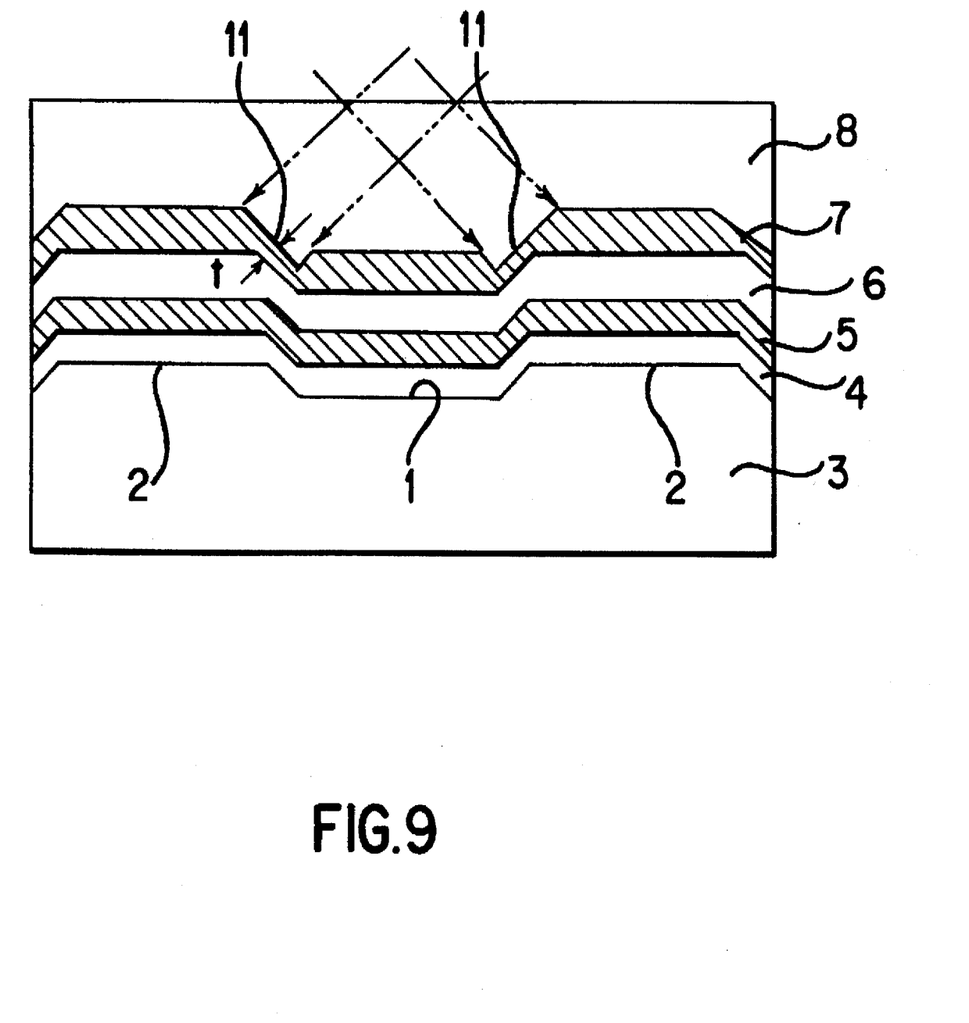
FIG. 9 is a schematic cross sectional view illustrating an optical recording medium of a further embodiment (Example 6) according to the present invention.

The optical recording medium in this example has, as shown in FIG. 9, the same constitution as that in Example 1 except for using a substrate having the depth h of 52 nm for the groove 1 of the substrate 3 in Example 1, forming an interference layer having a layer thickness of 25 nm both on the groove 1 and the land 2 instead of the interference layer 6 in Example 1 and, further, forming the layer thickness t for the land wall 11 of the reflection layer 7 to 10 nm.

The land wall (layer thickness t thereof) for the reflection layer 7 was formed by forming the reflection layer forming material to a predetermined thickness by usual sputtering and then reducing the thickness till 10 nm by oblique etching. The oblique etching comprises basically the same constitution as in the case of the oblique etching in Example 2, except for using $Ar^+$ ion beam as an etching beam and setting the irradiation angle θ of the beam to 45°. FIG. 9 shows the irradiation state of the ion beam in this case by dotted chains. Further, since the reflection layer portion on the groove and the land is etched and removed to some extent upon etching, deposition is conducted by a sputtering method to a layer thickness while taking the amount of removal into consideration.

Then, using the optical recording medium of this example and conducting mark-length recording to the groove and the land in the same manner as in Example 1, the crosstalk was measured and the change of the jitter was also measured for the optical recording medium after recording in the same manner as in Example 1. FIG. 11 shows the result of measurement for the crosstalk and the jitter.

From the result of the measurement shown in FIG. 11, it was confirmed in the optical recording medium of this example that the crosstalk is sufficiently suppressed as being less than the allowable level at −30 dB and the cross-erase is also suppressed satisfactory since the increasing amount of the jitter was less than the allowable level of 20% and that the satisfactorily recording characteristic and reproducing characteristic are obtained even in a case of narrowing the track pitch to 0.5 μm.

EXAMPLE 7

Figure 10:
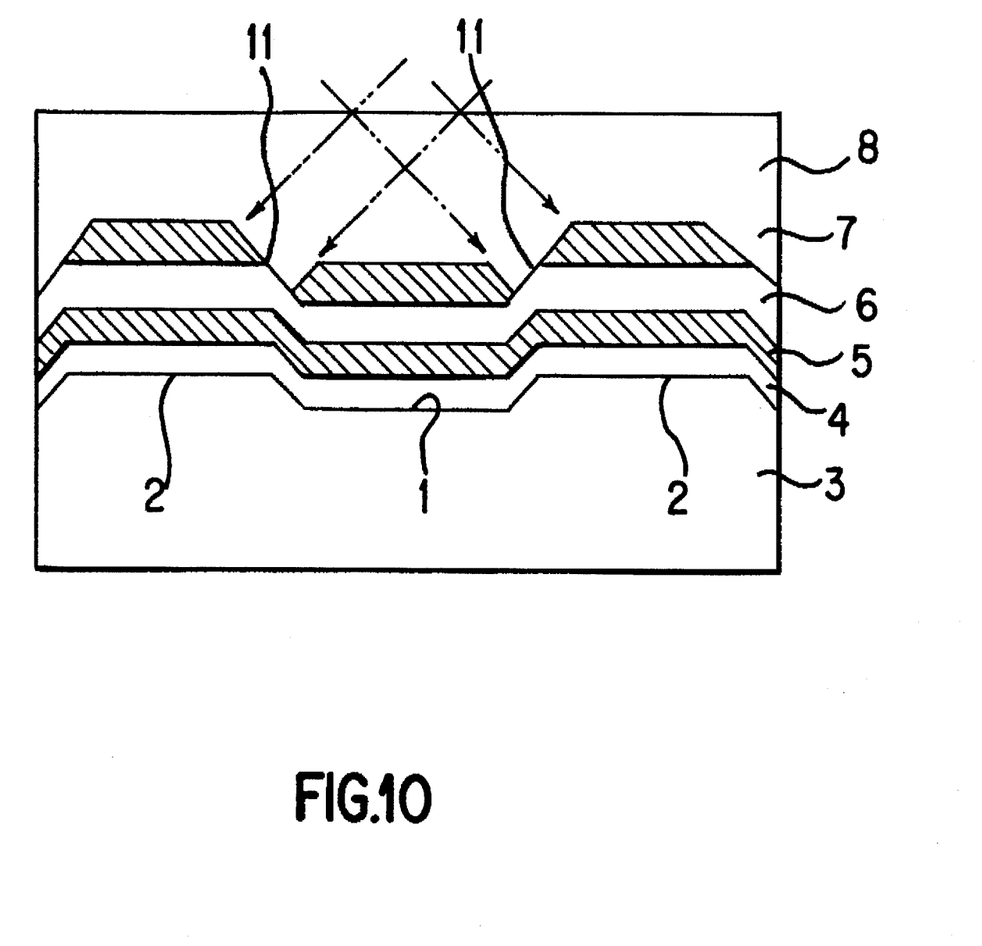
FIG. 10 is a schematic cross sectional view illustrating an optical recording medium of a further embodiment (Example 7) according to the present invention.

The optical recording medium in this example has the same constitution as in Example 1 excepting for using, as shown in FIG. 10, a substrate having the depth h of 55 nm for the groove 1 of the substrate 3 in Example 6 and forming the layer thickness for the land wall of the reflection layer 7 to zero. The land wall (layer thickness zero) of the reflection layer 7 was formed by forming the reflection layer forming material to a predetermined thickness for the reflection layer by a usual sputtering method and then applying a film thinning treatment by dry etching till the reflection layer forming material deposited to the side wall was completely removed.

Then, using the optical recording medium of this example and after conducting mark-length recording for the groove and the land in the same manner as in Example 1, the crosstalk was measured and the change of the jitter was also measured for the optical recording medium after recording in the same manner as in Example 1. FIG. 11 shows the result of measurement for the crosstalk and the jitter.

From the result of measurement shown in FIG. 11, it was confirmed in the optical recording medium in this example that the crosstalk was sufficiently suppressed as being less than the allowable level at −30 dB and the cross-erase was also suppressed satisfactorily since the increasing amount of the jitter is less than the allowable level of 20% and that satisfactory recording characteristic and reproducing characteristic can be obtained even in a case of narrowing the track pitch to 0.5 μm.

As has been described above, the optical recording medium according to the present invention is a medium used for the land & groove recording method which can increase the track density while suppressing the crosstalk and also suppressing the cross-erase (increase of jitter), thereby enabling to attain increased capacity. Accordingly, the optical recording medium according to the present invention is extremely effective for recording various kinds of enormous data including video digital signals.

What is claimed is:

1. An optical recording medium for land and groove recording having a medium structure in which a protection layer, a recording layer, an interference layer and a reflection layer are laminated, recording tracks comprising grooves and lands are formed, and information signals are recorded and reproduced by utilizing a change of reflectance obtained by irradiating an optical beam to both the grooves and the lands, wherein at least one of the protection layer, the recording layer and the interference layer is formed to a layer thickness different between the groove and the land, whereby upon irradiation of the optical beam to a predetermined track, the reflectance of of the optical beam to a predetermined track, the reflectance of the optical beam in a portion of a track adjacent to the predetermined track in a recorded state is equal to the reflectance of the optical beam in a portion of a track in an unrecorded state.

2. An optical recording medium as defined in claim 1, wherein the depth for the groove in the reflection layer is made greater than 60 nm.

3. An optical recording medium for land and groove recording:

a laminated medium structure including a protection layer, a recording layer, an interference layer and a reflection layer;

recording tracks having grooves and lands, wherein information signals are recorded and reproduced by utilizing a change of reflectance obtained by irradiating an optical beam to both the grooves and the lands;

a side wall connecting adjacent tracks including a means for reducing heat conduction between adjacent tracks, wherein the means for reducing heat conduction comprises forming a layer thickness for the side wall connecting the land and the groove for any selected layer of the protection layer, the recording layer, the interference layer and the reflection layer, said layer thickness being formed to less than a layer thickness of the groove and the land for said selected layer.

4. The optical recording medium of claim 3, wherein the layer thickness along substantially an entire length of the side wall is less than the layer thickness of an adjacent groove and land.

5. An optical recording medium for land and groove recording having a medium structure in which a protection layer, a recording layer, an interference layer and a reflection layer are laminated, recording tracks comprising grooves and lands are formed, and information signals are recorded and reproduced by utilizing the change of reflectance obtained by irradiating an optical beam to both the grooves and the lands, wherein any one of the protection layer, the recording layer, the interference layer and the reflection layer is formed in a discontinuous manner such that the land and the groove are separated from each other.

6. A method of forming an optical recording medium comprising:

providing a laminated medium structure including a protection layer, a recording layer, an interference layer and a reflection layer;

forming recording tracks comprising grooves and lands on the laminated medium structure;

dimensioning the thickness of the grooves and lands so that upon irradiation of an optical beam to a predetermined track, the reflectance of the optical beam in a portion of a track adjacent to the predetermined track in a recorded state is equal to the reflectance of the optical beam in a portion of a track in an unrecorded state.

7. The method of claim 6, further comprising:

providing a side wall connecting a groove to an adjacent land; and dimensioning the side wall so that heat conduction between adjacent tracks is reduced.

8. The method of claim 6, further comprising:

separating the lands from the grooves so that heat conduction between adjacent tracks is reduced.

* * * * *